United States Patent
Rodriguez-Val et al.

(10) Patent No.: US 7,822,703 B1
(45) Date of Patent: Oct. 26, 2010

(54) AUTOMATIC VERIFICATION OF A USER

(75) Inventors: Richard Rodriguez-Val, Fairfax, VA (US); Laura Laughlin, Herndon, VA (US); Robert Aaronson, Ashburn, VA (US); Fady Semaan, Great Falls, VA (US)

(73) Assignee: AOL LLC, Dulles, VA (US)

( * ) Notice: Subject to any disclaimer, the term of this patent is extended or adjusted under 35 U.S.C. 154(b) by 2067 days.

(21) Appl. No.: 10/032,006

(22) Filed: Dec. 31, 2001

(51) Int. Cl.
*G06F 17/00* (2006.01)

(52) U.S. Cl. .................. 707/102; 707/101; 707/104.1; 707/9

(58) Field of Classification Search .............. 707/3–9, 707/100–104.1; 713/201, 155–156, 170, 713/171; 705/44, 41; 709/229, 217, 224; 395/188
See application file for complete search history.

(56) References Cited

U.S. PATENT DOCUMENTS

| | | | | |
|---|---|---|---|---|
| 4,816,654 A | * | 3/1989 | Anderl et al. | 235/380 |
| 5,699,514 A | * | 12/1997 | Durinovic-Johri et al. | 713/202 |
| 5,987,508 A | * | 11/1999 | Agraharam et al. | 709/217 |
| 6,363,357 B1 | * | 3/2002 | Rosenberg et al. | 705/26 |
| 6,539,479 B1 | * | 3/2003 | Wu | 713/151 |
| 6,775,782 B1 | * | 8/2004 | Buros et al. | 713/201 |
| 6,807,574 B1 | * | 10/2004 | Partovi et al. | 709/224 |
| 6,820,802 B2 | * | 11/2004 | Biggar et al. | 235/379 |
| 6,842,767 B1 | * | 1/2005 | Partovi et al. | 709/203 |
| 7,080,049 B2 | * | 7/2006 | Truitt et al. | 705/75 |

* cited by examiner

*Primary Examiner*—Sana AL-Hashemi
(74) *Attorney, Agent, or Firm*—Fish & Richardson P.C.

(57) ABSTRACT

A system and method are described for verifying a user. More specifically, a user contacts a goods or service provider and gives that provider information about himself or herself in order to register for receipt of goods or services. The provider then uses this information along with other information detected from another source, such as a network provider, to verify that the user is providing accurate information. Once the provider has determined that the information provided by the user is accurate, the user is allowed to register for certain services or purchase goods. A component of these systems and methods is to perform format and frequency of usage checks on the received data from the user and/or the network provider.

43 Claims, 4 Drawing Sheets

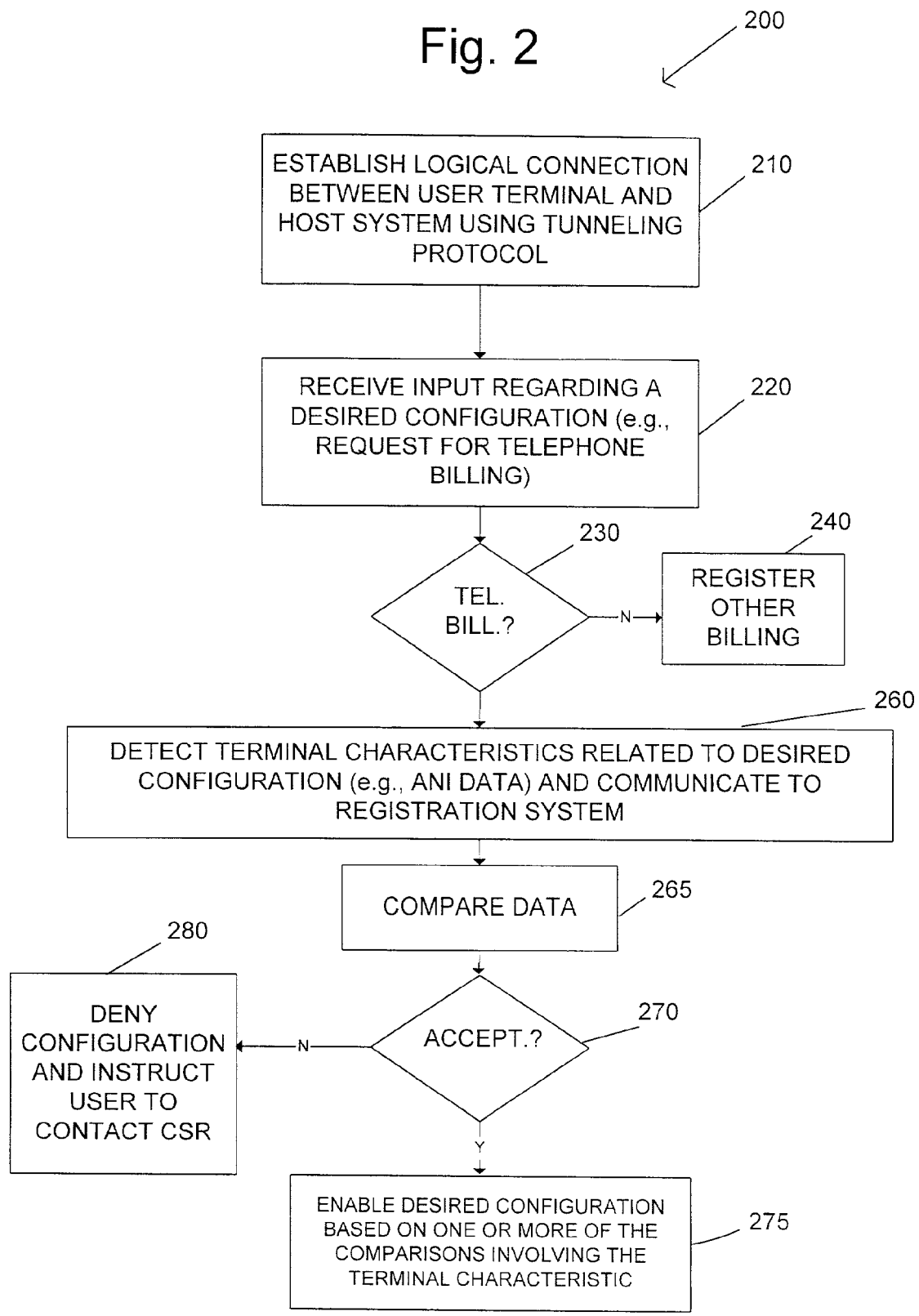

AUTOMATIC VERIFICATION OF A USER

TECHNICAL FIELD

This invention relates to verification of customers in a network, and more particularly to the extraction and use of phone number data for verification purposes.

BACKGROUND

Credit card companies attempt to prevent fraud by authenticating cardholders before activating new credit cards. Such authentication may be accomplished by requiring new cardholders to initiate calls from their home telephone numbers to activate new cards. When a cardholder places a call, typically using a toll free telephone number, the telephone number of the caller is transmitted to the credit card company for use by the credit card company in verifying that a valid cardholder possesses the credit card before enabling use of the credit card. This authentication system presupposes that an invalid cardholder (e.g., a thief) will not have access to a cardholder's phone, rendering the invalid cardholder unable to activate a stolen credit card.

SUMMARY

In one implementation, a user configuration is accomplished by receiving first data indicative of information regarding a user characteristic and detecting second data indicative of a communications characteristic for the user. A determination is then made as to whether the first data and second data are related. A decision as to whether to establish the user configuration then is made based upon the results of the determination of relatedness of the first data and the second data.

This and other aspects allow a company to verify the information provided by a user before allowing the user to register or purchase goods or services. In one implementation, the verification is used to allow a user to enable a particular configuration of the services that the user wishes to purchase. In this implementation, the service provider receives data entered by the user and detects data provided by a communications system. These two pieces of data are used to make comparisons and to determine whether to allow the user to register for a particular service or purchase a good.

Implementations may include one or more of the following features. For example, a terminal server may detect ANI data from a network and forward that data to a registration system. This ANI data may be passed from the terminal server to the registration system using a tunneling protocol. In another example, the user enters user characteristic data such as a name or address. This user-entered data may be used to retrieve a telephone number from a database. The retrieved telephone number then is compared with the phone number represented by the detected ANI data. If there is a match, the user is allowed to configure an account for a particular billing service.

The details of one or more implementations are set forth in the accompanying drawings and the description below. Other features and advantages will be apparent from the description and drawings, and from the claims.

DESCRIPTION OF DRAWINGS

FIG. 2 is a flow chart of a process of operation of the system of FIG. 1A.

Like reference symbols in the various drawings indicate like elements.

DETAILED DESCRIPTION

Accessible computer systems and Internet Service Providers (ISPs) need to verify user information and identity. To this end, a verification or authentication system is employed. In this system, a user dials into the ISP modem bank to communicate with a registration server or host that prompts the user for their home phone number. Using information provided manually by the user and information detected concerning a communications characteristic associated with the user, the registration server or host verifies the user.

Figure 1A:
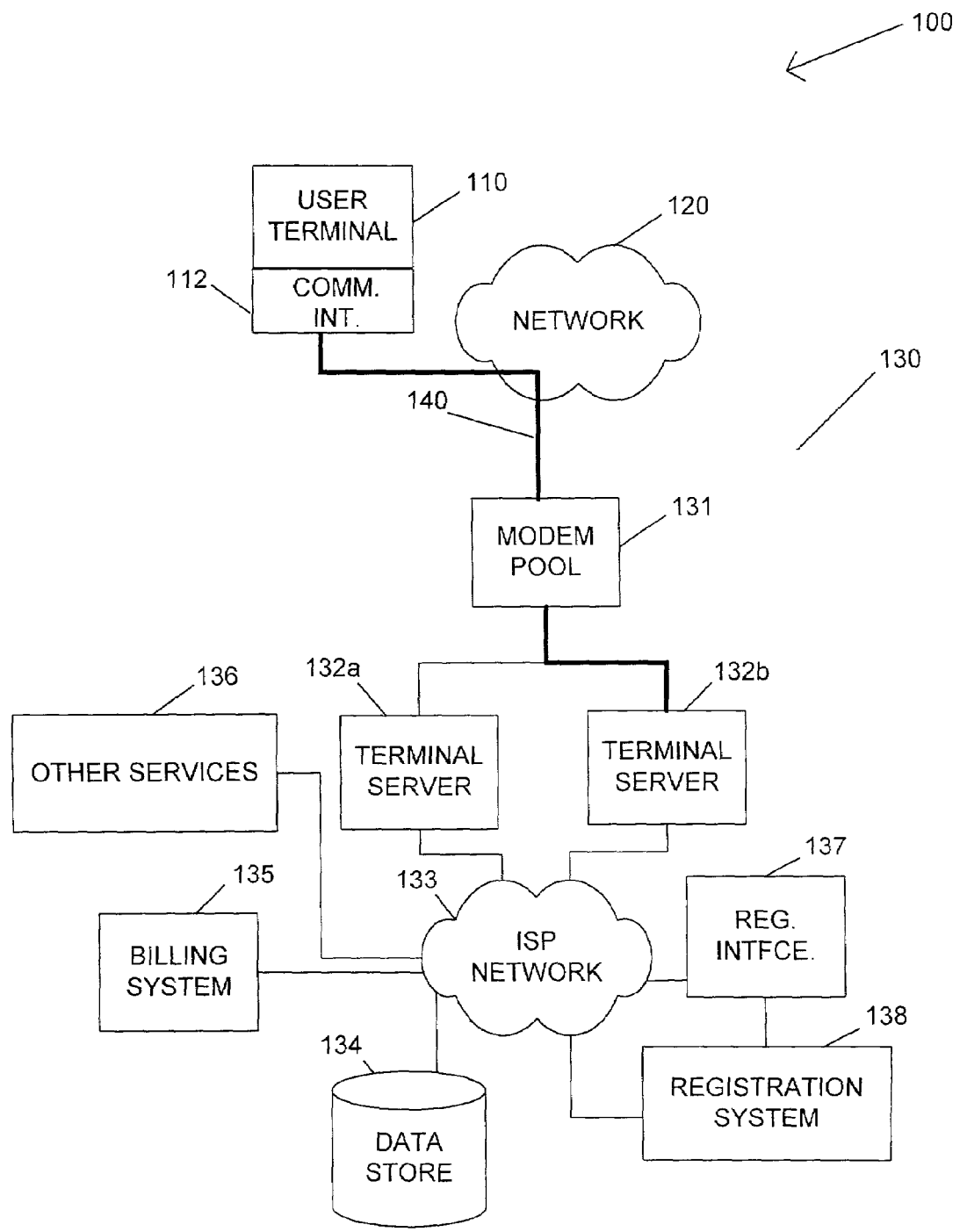
FIGS. 1A and 1B are block diagrams of registration systems.

FIG. 1A shows a system 100 for enabling online services. System 100 includes a user terminal 110, a network 120, and an Internet service provider (ISP) 130.

The user terminal 110 enables entry of commands and receipt of information by a user. Examples of user terminals 110 include personal computers, personal digital assistants, notebook computers and interactive televisions. User terminal 110 includes a communication interface 112 capable of transmitting and receiving data between the user terminal 110 and the network 120. Examples of communication interfaces 112 include modems, wireless modems, cable boxes and RF transmitters and receivers such as satellite dish systems.

Network 120 couples the user terminal 110 to the ISP 130. Examples of a network 120 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. Network 120 includes communication pathways that enable communications between the user terminal 110 and the ISP 130. Each of these communication pathways may include, for example, a wired, wireless, cable or satellite connection. In one implementation, network 120 is the public-switched telephone network (PSTN). Other embodiments may use private networks or a combination of private and public networks.

The network 120 enables access to accessible computer systems and the ISP 130. As shown in FIG. 1A, the ISP 130 generally includes a modem pool 131, one or more terminal servers 132a and 132b, and an ISP network 133.

The modem pool 131 includes a combination of several communication devices (e.g., modems, telephone, digital subscriber line (DSL) and cable) that are capable of interfacing the ISP 130 and equipment communicating through the ISP 130 with the network 120. Typically, the devices within modem pool 131 are located at a single location associated with a single telephone number. In alternative implementations, the devices within modem pool 131 may be distributed over several locations and may operate using one or more telephone numbers, or may be located at a single physical location using several different telephone numbers. The modem pool 131 receives signals from the user terminal 110, and forwards those signals to terminal servers 132a and 132b. Conversely, when ISP 130 or equipment communicating through the ISP 130 originates communications, the modem pool 131 receives signals from terminal servers 132a and 132b, and forwards those signals to the user terminal 110 through the network 120.

Terminal servers 132a and 132b are computers that support the protocol used for communications between the user terminal 110 and the ISP 130. That is, terminal servers 132a and 132b receive and process instructions from the user terminal 110. For instance, when an instruction is submitted by a user wishing to retrieve a specific Web page, one or both of terminal servers 132a and 132b access the Web page from the appropriate host and provide it to the user terminal 110. In addition to being coupled to network 120, terminal servers 132a and 132b are also coupled to the ISP network 133.

ISP network 133 couples the terminal servers 132a and 132b to other servers and hosts, which allows the user to dial into a single modem pool 131 and obtain services from other servers that are coupled to ISP network 133. ISP network 133 includes communication pathways that enable communications between the terminal servers 132a and 132b and other servers and hosts.

Examples of devices coupled to ISP network 133 include a data store 134, a billing system 135, and other servers, data stores and networks represented by other services 136. Data store 134 stores data used by ISP 130. Data store 134 also stores all types of master files. Master files are files for storing individual user accounts, and individual data such as the user's name, login name, password, address, telephone numbers and billing preference (i.e., a preference to receive bills through the user's telephone company, credit card company or the ISP directly).

Billing system 135 operates software and either generates invoices for ISP services directly or sends data to third parties such as credit card companies or telephone companies. The third parties use data in these messages to generate bills to users that include charges incurred for using ISP services. The other services 136 include servers that support email, instant messaging, voice communications and access to data stores that store Web pages. The other services block 136 is shown in FIG. 1A to include other services offered by the ISP 130 as well as information and services outside of the ISP 130.

ISP 130 also may include devices capable of verifying and validating customer information, such as billing information. For instance, the ISP 130 shown in FIG. 1A includes a registration interface server 137 and a registration system 138. Through the ISP network 133, terminal servers 132a and 132b are coupled to the registration interface server 137 and ultimately the verification system 138.

One or more of several different types of registration interface servers 137 are contemplated. These registration interface servers 137 act as communication interfaces to enable various forms of communication between the user terminal 110 and the verification system 138. For instance, in the implementation shown in FIG. 1A, the registration interface server 137 may be designed to handle communications received by the ISP 130 in the form of telephone connections. Other types of registration interface servers 137 may process customer service operator interactions employed or contracted by the ISP or communications with other devices such as interactive televisions. In other words, registration interface server 137 may be specific to one or more particular types of communication used to access the ISP 130 so as to enable the registration system 138 to operate, regardless of the mode by which a user accesses the ISP 130. The registration interface server 137 shown in FIG. 1A manages communications between the user terminal 110 and the registration system 138.

In one implementation, the registration system 138 may include one or more computers and one or more data stores that contain algorithms and user prompts to enable a user to register for ISP service. In this implementation, the registration system 138 may prompt the user for information such as name, address, telephone number and choice of billing preference. The registration system 138 receives this information and establishes a new user account. The user account is used by the ISP 130 to allow the user to obtain online services. In addition, the ISP 130 checks data in the user account to bill the user for the amount of online services consumed.

Within ISP 130, communications are established between terminal severs 132a and 132b and the registration system 138 to enable registration and verification of users seeking access to the ISP 130. To facilitate this registration and verification process, as will be described with respect to FIGS. 2 and 3, a tunneling protocol may be used to establish a virtual tunnel 140 between the user terminal 110 and terminal server 132b. As illustrated, the virtual tunnel 140 generally extends from the user terminal 110 to terminal server 132b through the network 120, and the modem pool 131. In one implementation, tunnel 140 supports the Layer 2 Tunneling Protocol (L2TP) and represents a point-to-point connection in a general network, which may be used to achieve increased security over other paths in the general network or otherwise.

Tunnel 140 is capable of carrying data between the endpoint elements, user terminal 110 and terminal server 132b. Typically, tunnel 140 carries data representative of requests and responses. For example, registration system 138 sends a request to the user at user terminal 110 for user identifying data, such as name, address and telephone number. That request is tunneled from the terminal server 132b to the user terminal 110 through the modem pool 131 and network 120. In like fashion, when the user responds to the request for data, the user provides the requested data through the user terminal 110. User terminal 110 forwards these data to the terminal server 132b using tunnel 140

Figure 1B:
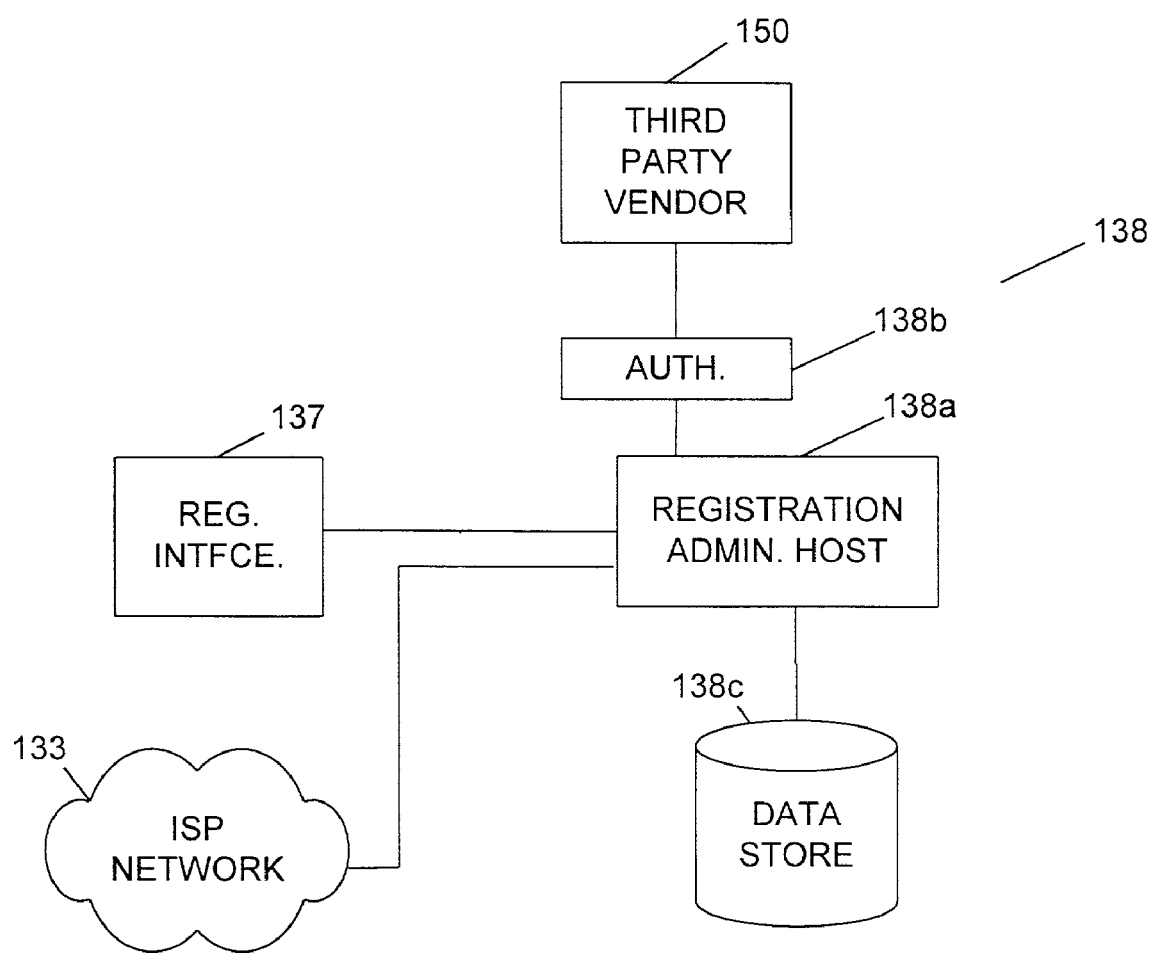

As shown in FIG. 1B, in one implementation, the registration system 138 may include a registration administration host 138a, an authorization server 138b, and a data store 138c. Registration administration host 138a also has a connection with ISP network 133, which allows it to write and receive data from data store 134 and to provide data to billing system 135. Also coupled to authorizer server 138a is a third party vendor 150.

Vendor 150 may be a company or organization other than the ISP that performs a specific function. As an example, third party vendor 150 may be a service that maintains a database of telephone information such as name, address and associated telephone number and that may be used to verify information for other companies such as the ISP 130.

In one implementation, registration administration host 138a performs several functions. For example, registration administration host 138a retrieves queries or requests data from data store 138c and forwards the requests to registration interface server 137. In addition, registration administration host 138a receives data from the user through the registration interface server 137. Once received, registration administration host 138a generates instructions for storing the received data into either data store 138c or 134 via ISP network 133. In addition, registration administration host 138a generates queries for authorizer 138b. As will be described later, authorizer 138b determines the validity of the data received from registration administration host 138a. In addition to verifying data, authorizer 138b generates queries with the data received from registration administration host 138a and forwards the queries to third party vendor 150.

In general, registration system 138 may be used to verify and register customers of an ISP or other online service based on tunneled data such as ANI (automatic number identification) data. As such, one use of system 100 is to allow a user to register for ISP service and elect to have the ISP charges billed to his or her telephone number. In order to prevent fraud and the accumulation of uncollectable ISP charges, the ISP 130 implements a system, like the exemplary system 100 shown in FIG. 1A, to verify and validate the telephone number of a customer requesting such a billing service.

The registration process typically involves receiving user characteristic data. User characteristic data identifies users and typically includes data such as name, address, phone number and billing preferences. The ISP 130 receives the user characteristic data and uses it to build a master file that keeps track of the user's account for online services and the charges incurred by the user. During registration, the user is allowed to configure his or her master file by providing configuration data. The configuration data represents a user choice on how he or she wishes to interact with the ISP 130. Examples of configuration data include how charges are accrued (e.g., flat fee per month vs. hourly charges) as well as how the bill for ISP 130 rendered services is to be forwarded to the user (e.g., credit card vs. telephone billing).

In one implementation, this verification may be performed by detecting communications characteristic data that identifies or corresponds to the user terminal 110. As an example, if the communication interface 112 is a modem that dials into modem pool 131, the network 120 will generate ANI data. ANI data represents a particular telephone number corresponding to the user terminal 110 from which the call is placed. This ANI data is detected by terminal server 132b at the end at tunnel 140. It should be noted that in one implementation network 120 almost always generates ANI data, but the detection of the ANI data is dependent upon the characteristics of the terminal servers 132a and 132b.

As shown in FIG. 2, a process 200 for registering a customer for telephone billing includes establishing a logical connection between the user terminal 110 and the registration system 138 using a tunneling protocol (step 210). For instance, with reference to the implementation shown in FIG. 1B, a tunneling protocol may be used to establish at least a portion of the logical connection between the user terminal 110 and the terminal server 132b. Over this logical connection, an out-of-band signal, such as one including automatic number identification (ANI) data, is forwarded. That is, between user terminal 110 and terminal servers 132a and 132b there is hardware and software that may be capable of supporting a tunneling protocol such as the Level 2 Tunneling Protocol (L2TP) that is able, in turn, to tunnel out-of-band signals like ANI data between those devices.

Once the logical connection is established, registration system 138 receives information from or about the user (step 220), generally in response to queries forwarded by registration system 138 to the user. In one implementation, the query is presented as a graphical user interface (GUI) that includes blank spaces for entry of the requested data. Typical information includes name, address and preferred choice of billing (e.g., billing of ISP services through the user's telephone bill).

In other implementations, user data may be obtained from other systems. As an example, a user who simply wishes to edit his or her user data (i.e. address or type of billing) dials into the modem pool 131. The user chooses to edit his or her data (i.e., last name or address). In response to the user choosing to edit user data, the registration system 138 allows for user input of user data, or may retrieve the existing user data and provide it to the user for modification or review. Typically, this is accomplished through a graphical user interface. The user simply updates some of the data fields with the new information and leaves the other data as they are. In this manner, the user data are retrieved from a data store and then edited as opposed to being obtained directly from a user as is typically done with a new user.

Registration system 138 determines whether the user has requested telephone billing or whether the user instead has requested some other form of billing, such as credit card billing or mailed invoices (step 230). If the user does not wish to have telephone billing, the registration process continues by registering other billing options for the user (step 240).

If the user chooses to have services billed through telephone billing, the ANI data are detected by the terminal server 132b, unpacked using the tunneling protocol and forwarded to the registration system 138 (step 260). The registration system 138 then compares or requests a comparison of the telephone number information represented by the detected ANI data with other information that may be received about the user (step 265). The user may directly enter the user information or it may be retrieved from a data store. The latter typically occurs when the user chooses to edit his or her user information as previously described.

In one implementation, the ISP 130 may communicate with a third party vendor 150 to perform this comparison on the data received. For instance, with reference to FIG. 1B, the registration administration host 138a may forward identification data (e.g., name or address) received from or about the user to the authorizer 138b, which forwards the identification data to the third party vendor 150 to obtain additional information or validation.

When the third party vendor 150 receives the identification data from the authorizer 138b, it performs a data retrieval from a data store maintained by or accessible to the third party vendor 150. For example, the third party vendor 150 may use the received identification data as the basis for retrieving one or more telephone numbers associated with the user. The third party vendor 150 then forwards the retrieved phone number (s) back to authorizer 135b for comparison against the telephone number derived through tunneling of the ANI data.

Alternatively, registration administration host 138a may forward to the third party vendor 150 identification data (e.g., user's name or address data) and the telephone number received as ANI data through the tunnel 140. The third party vendor 150 retrieves or accesses a phone number corresponding to the received identification data and performs a comparison between this number and the ANI data. The third party vendor then accepts (e.g., when the phone numbers match) or rejects (e.g., when the phone numbers do not match) the user's request for telephone billing and communicates an appropriate message to the registration administration host 138a through the authorizer 138b.

In either case, the authorizer 138b determines if the user's telephone number is acceptable based on the information received (step 270). As described earlier, this can be accomplished by the authorizer 138b performing its own comparison between the ANI data received from the tunnel and the phone number forwarded to the authorizer 138b, or by the authorizer 138b reading the message, either acceptance or rejection, forwarded to it by the third party vendor 150.

If the user entered data is verified, a user configuration is established (step 275) for instance, in the example described above, the user is allowed to be billed through his or her telephone billing system for the ISP or other services provided. Typically, this billing option is created by entering data into a field in the user's master file stored in data store 134. That is, the registration system 138 stores the telephone billing code in the corresponding field in the user's master file in data store 134 through ISP network 133 so that the user's master file is configured to have the user billed through telephone billing.

Establishing a user configuration generally may be contrasted with actuating a new user account, in that user configurations are established to enhance user functionality rather than to provide security. That said, in one implementation, the verification described herein is executed contemporaneously with registration by a new user requesting service. In this implementation, as the user is registering for activation, the user may invoke the verification system to avail himself/herself of functionality or services such as telephone billing.

If the information does not match (see step 270), the user is informed of the fact that telephone billing is not allowed and may be instructed to contact a customer service representative (CSR) (step 280). The message provided to the user may be visual, audio or a combination of both.

If telephone billing is accepted (step 275), the ISP 130 is authorized to bill that particular telephone number. That is, the ISP is allowed to push, or have pulled, charges for ISP services to the telephone company. In one implementation, the master file is ready to determine billing details for a user (e.g., timing and method of billing). If the master file has data indicating that the user is to be billed through a telephone bill, the amount of the charges associated with having online services or purchases made through the ISP are determined and forwarded to the telephone company. In other implementations, the telephone services are provided by the ISP itself and the charges associated with enabling the user to have online services are simply added into the tolls and taxes associated with telephone usage. In yet another implementation, the telephone company is given access to the ISP's master file on a periodic basis. The telephone company extracts the data it needs, such as the charges for the user's online services, and adds the amount into its bill before sending it to the user. In this manner, charges incurred by a user using an ISP may not be restricted to the charges associated with maintaining online services. That is, the ISP may sell goods or services directly to the user that are in turn billed to the user through a telephone bill.

Preliminary analysis may be performed on terminal characteristic data. Terminal characteristic data are either user-entered data, data retrieved from a data store, or ANI data that identify a user terminal. For example, a phone number is a terminal characteristic. The terminal characteristic data may be checked for things such as properness of the data (i.e., a toll free number or number associated with an entity or an establishment such as a prison that cannot be used for phone billing), the format of the received data (i.e., all digits and having ten digits in total), and/or the number of users associated with the data (i.e., the number of users in a household who have an account with ISP 130).

Figure 3:
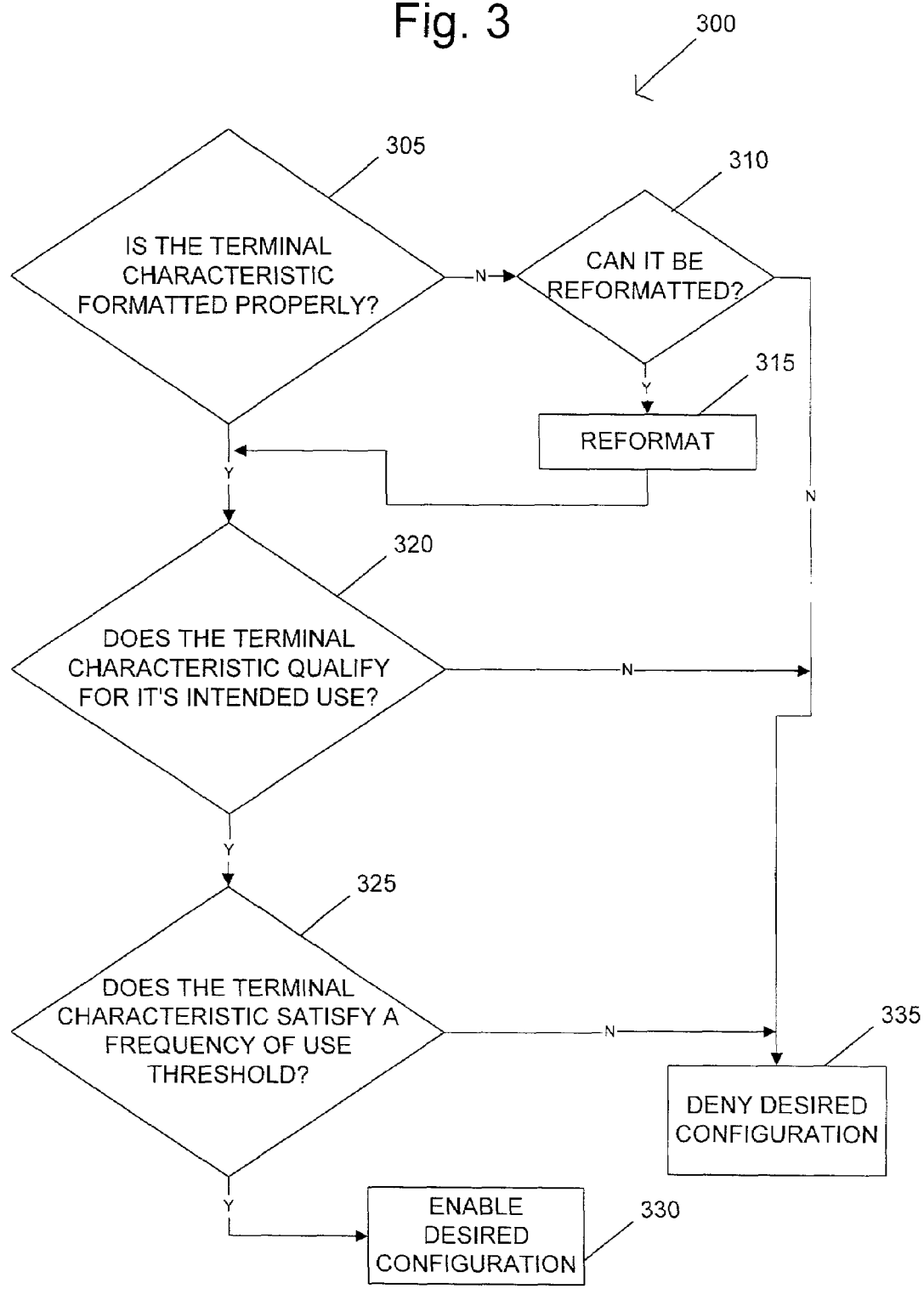
FIG. 3 is a flow chart of a data checking procedure implemented by the system of FIG. 1A.

FIG. 3 shows an exemplary process for making these determinations using telephone numbers as terminal characteristic data. In this process, the format of the received data is checked (step 305) to determine whether a full set of telephone number data was received (i.e., ten digits) and whether the telephone number contains letters instead of all numbers. If the received telephone number data is not formatted properly, it will be evaluated to determine whether it can be reformatted (e.g., substitute a number for a received letter) (step 310). The telephone number data will be reformatted where possible (step 315).

If the received data are properly formatted upon receipt (see step 305) or properly reformatted (see step 315), the source of the telephone number data is checked to determine whether it is appropriate for billing (step 320). If the received telephone number data is from an acceptable telephone number, the number of accounts already associated with that telephone number is determined and evaluated to determine whether it exceeds a threshold (step 325) (i.e. too many accounts associated with one telephone number).

If the received data passes all three tests, the user is allowed to use telephone billing (step 330). If the data fails any one of those tests, the user is denied the option of automatically invoking telephone billing (step 335).

A number of implementations have been described. Nevertheless, it will be understood that various modifications may be made. Accordingly, other implementations are within the scope of the following claims.

As an example, the previously described systems and methods allow for either contemporaneous user verification or batch verifications. In the contemporaneous implementation, the systems go through the above methods upon receipt of the user data and detection of the ANI data. That is, the systems and methods are initiated by the receipt of user data or detection of the ANI data. In this manner, the user is allowed to receive online services immediately and be billed in the manner he or she desires. Alternatively, the systems and methods collect user data, user configuration data and ANI data over a period of time and batch process the group at one time. As an example, a group of users may provide their data and have the corresponding ANI data detected on one day and be allowed to receive online services the next day after the batch process has been performed.

As an example, another implementation of this system and method eliminates the use of the third party vendor 150. In that implementation, the ISP 130 has the capability to look-up telephone numbers and compare them to the received ANI data.

In addition, this system and method may be implemented in online purchase centers. A retailer may accept orders to purchase goods or services from the user through the Internet. If the user agrees to allow the ISP to forward the ANI data it receives from the network 120 to the retailer, the retailer may then use the received ANI data to validate the proffered form of payment. As an example, once the retailer has the ANI data, it can use that data as a key to retrieve data from a data store. The retrieved data may be the credit card account number the user is using to make the purchase. The retailer can then compare the retrieved credit card account number with the proffered credit card number and either allow the purchase or deny it.

In yet another implementation, the retailer allows the user to purchase goods or services and have the associated charges billed to a telephone number account. When the user selects telephone billing, the retailer may request the ANI data previously received by the ISP from the PSTN. Assuming that the user has authorized the ISP to provide that data to others, the ISP then forwards the ANI data to the retailer that the retailer uses, in turn, to validate the authenticity of the user (i.e., that it is likely that the user is the person he or she proffers to be).

In yet other implementations, there are a plurality of ways of associating telephone numbers with user accounts. As described above, multiple accounts may be associated with a single telephone number. In addition, other implementation allow for multiple telephone numbers associated with a single account. For example, this situation can arise where parents have a telephone line for their use and a second telephone line for their teenager's use. Both parents and the teenager share a single ISP account, yet they each access it from a different telephone number.

This system also allows a user to edit the billing information. Such a situation occurs when the user moves and obtains a new telephone number. The user's master file need only be updated with the user's new home address and phone number. Once that is provided, the user is billed as was done previously.

What is claimed is:

1. A method for allowing a user to register with an Internet Service Provider ("ISP") to inspire billing of charges that are incurred incident to receipt of the requested services offered by or through the ISP to a telephone bill, the method comprising:
   receiving, from a client device, a request to access services offered by or through the ISP;
   in response to the request to access the services offered by or through the ISP, requesting from a user of the client device, to identify a choice of billing for charges that are incurred incident to receipt of the requested services offered by or through the ISP;
   receiving, from the user, the choice of billing for the charges that are incurred incident to receipt of the requested services offered by or through the ISP;
   analyzing the response to determine whether the user has requested telephone billing for the charges that are incurred incident to receipt of the requested services offered by or through the ISP;
   based on analyzing the response, determining that the user has requested telephone billing for the charges that are incurred incident to receipt of the requested services offered by or through the ISP;
   retrieving a telephone number associated with the user;
   determining a number of users who have previously selected the telephone number for billing the charges incident to receipt of the requested services offered by or through the ISP;
   accessing a threshold that enables determination of a number of users permitted to bill charges for services to the telephone number;
   determining whether the number of users exceeds the threshold;
   denying user-requested telephone billing for the charges that are incurred incident to receipt of the requested services offered by or through the ISP when it is determined that the number of users exceed the threshold; and
   enabling user-requested telephone billing for the charges that are incurred incident to receipt of the requested services offered by or through the ISP when it is determined that the number of users does not exceed the threshold.

2. The method of claim 1 wherein receiving the request to access services offered by or through the ISP includes receiving a request to access services offered by the ISP.

3. The method of claim 1 wherein receiving the request to access services offered by or through the ISP includes receiving a request to access services offered through the ISP.

4. The method of claim 1 further comprising requesting, from the user and in response to the request to access the services offered by or through the ISP, a user identifying data.

5. The method of claim 4 wherein the user identifying data includes a user name, a user address, or a user telephone number.

6. The method of claim 1 wherein retrieving the telephone number includes retrieving Automatic Number Identification ("ANI") data associated with a user terminal from which the request to access services offered by or through the ISP is received.

7. The method of claim 6 further comprising requesting, from the user and in response to the request to access the services offered by or through the ISP, a user identifying data.

8. The method of claim 7 wherein the user identifying data includes a user telephone number.

9. The method of claim 7 further comprising:
   comparing the user identifying data with the ANI data; and
   using a result of comparison between the user identifying data and the ANI data as a condition precedent to enabling the user-requested telephone billing for the charges that are incurred incident to the receipt of the requested services offered by or through the ISP.

10. The method of claim 7 further comprising:
    sending the user identifying data to a third party vendor;
    requesting, from the third party vendor, additional information about the user; and
    receiving, from the third party vendor and in response to the request, the additional information.

11. The method of claim 10 wherein the additional information includes a telephone number associated with the user.

12. The method of claim 11 further comprising:
    comparing the telephone number associated with the user with the ANI data; and
    using a result of comparison as a condition precedent to enabling the user-requested telephone billing for the charges that are incurred incident to the receipt of the requested services offered by or through the ISP.

13. The method of claim 7 further comprising:
    sending the user identifying data and the ANI data to a third party vendor;
    requesting, from the third party vendor, to perform a comparison between a telephone number associated with the user identifying data and the ANI data;
    receiving, from the third party vendor, a result of the comparison; and
    using a result of comparison as a condition precedent to enabling the user-requested telephone billing for the charges that are incurred incident to the receipt of the requested services offered by or through the ISP.

14. The method of claim 1 wherein determining the number of users who have previously selected the telephone number for billing the charges incurred through the ISP includes determining a number of accounts associated with the telephone number.

15. The method of claim 1 further comprising:
    determining whether the retrieved telephone number is from an acceptable source;
    using a result of determination as a condition precedent to enabling the user-requested telephone billing for the charges that are incurred incident to the receipt of the requested services offered by or through the ISP.

16. The method of claim 1 further comprising:
    accessing format criteria that enable determination of whether the formatting characteristic of the telephone number satisfies the format criteria;
    comparing the formatting characteristic of the telephone number against format criteria;
    using a comparison of format between the formatting characteristic and the format criteria as a condition precedent to enabling the user-requested telephone billing for the charges that are incurred incident to the receipt of the requested services offered by or through the ISP; and
    enabling the user-requested telephone billing for the charges that are incurred incident to the receipt of the requested services offered by or through the ISP when the formatting characteristic satisfies the format criteria.

17. A method for allowing a user to register with an Internet Service Provider ("ISP") to inspire billing of charges that are incurred incident to receipt of the requested services offered by or through the ISP to a telephone bill, the method comprising:

receiving, from a client device, a request to access services offered by or through the ISP;

in response to the request to access the services offered by or through the ISP, requesting from a user of the client device, to identify a choice of billing for charges that are incurred incident to receipt of the requested services offered by or through the ISP;

receiving, from the user, the choice of billing for the charges that are incurred incident to receipt of the requested services offered by or through the ISP;

analyzing the response to determine whether the user has requested telephone billing for the charges that are incurred incident to receipt of the requested services offered by or through the ISP;

based on analyzing the response, determining that the user has requested telephone billing for the charges that are incurred incident to receipt of the requested services offered by or through the ISP;

retrieving a telephone number associated with the user;

identifying a formatting characteristic of the telephone number;

accessing format criteria that enable determination of whether the formatting characteristic of the telephone number satisfies the format criteria;

comparing the formatting characteristic of the telephone number against format criteria;

resolving information based on results of the comparison between the formatting characteristic and the format criteria;

using the information resolved based on results of the comparison between the formatting characteristic and the format criteria as a condition precedent to enabling the user-requested telephone billing for the charges that are incurred incident to the receipt of the requested services offered by or through the ISP; and enabling the user-requested telephone billing for the charges that are incurred incident to the receipt of the requested services offered by or through the ISP when the formatting characteristic satisfies the format criteria.

18. The method of claim 17 wherein receiving the request to access services offered by or through the ISP includes receiving a request to access services offered by the ISP.

19. The method of claim 17 wherein receiving the request to access services offered by or through the ISP includes receiving a request to access services offered through the ISP.

20. The method of claim 17 further comprising requesting, from the user and in response to the request to access the services offered by or through the ISP, a user identifying data.

21. The method of claim 20 wherein the user identifying data includes a user name, a user address, or a user telephone number.

22. The method of claim 17 wherein retrieving the telephone number includes retrieving Automatic Number Identification ("ANI") data associated with a user terminal from which the request to access services offered by or through the ISP is received.

23. The method of claim 22 further comprising requesting, from the user and in response to the request to access the services offered by or through the ISP, a user identifying data.

24. The method of claim 23 wherein the user identifying data includes a user telephone number.

25. The method of claim 23 further comprising:
comparing the user identifying data with the ANI data; and
using a result of comparison between the user identifying data and the ANI data as a condition precedent to enabling the user-requested telephone billing for the charges that are incurred incident to the receipt of the requested services offered by or through the ISP.

26. The method of claim 23 further comprising:
sending the user identifying data to a third party vendor;
requesting, from the third party vendor, additional information about the user; and
receiving, from the third party vendor and in response to the request, the additional information.

27. The method of claim 26 wherein the additional information includes a telephone number associated with the user.

28. The method of claim 27 further comprising:
comparing the telephone number associated with the user with the ANI data; and
using a result of comparison as a condition precedent to enabling the user-requested telephone billing for the charges that are incurred incident to the receipt of the requested services offered by or through the ISP.

29. The method of claim 23 further comprising:
sending the user identifying data and the ANI data to a third party vendor;
requesting, from the third party vendor, to perform a comparison between a telephone number associated with the user identifying data and the ANT data;
receiving, from the third party vendor, a result of the comparison; and
using a result of comparison as a condition precedent to enabling the user-requested telephone billing for the charges that are incurred incident to the receipt of the requested services offered by or through the ISP.

30. The method of claim 17 further comprising:
determining whether the retrieved telephone number is from an acceptable source;
using a result of determination as a condition precedent to enabling the user-requested telephone billing for the charges that are incurred incident to the receipt of the requested services offered by or through the ISP.

31. The method of claim 17 further comprising:
determining a number of users who have previously selected the telephone number for billing the charges incident to receipt of the requested services offered by or through the ISP;
accessing a threshold that enables determination of a number of users permitted to bill charges for services to the telephone number;
determining whether the number of users exceeds the threshold; and
denying user-requested telephone billing for the charges that are incurred incident to receipt of the requested services offered by or through the ISP when it is determined that the number of users exceed the threshold.

32. The method of claim 17 further comprising:
determining the formatting characteristic of the telephone number fails to satisfy the format criteria; and
reformatting the retrieved telephone number to include a proper formatting characteristic if the data received can be reformatted to include the proper formatting characteristic.

33. A system for allowing a user to register with an Internet Service Provider ("ISP") to inspire billing of charges that are incurred incident to receipt of the requested services offered by or through the ISP to a telephone bill, the system comprising:

means for receiving, from a client device, a request to access services offered by or through the ISP;

means for requesting from a user of the client device and in response to the request to access the services offered by or through the ISP to identify a choice of billing for charges that are incurred incident to receipt of the requested services offered by or through the ISP;

means for receiving, from the user, the choice of billing for the charges that are incurred incident to receipt of the requested services offered by or through the ISP;

means for analyzing the response to determine whether the user has requested telephone billing for the charges that are incurred incident to receipt of the requested services offered by or through the ISP;

means for determining, based on analyzing the response, that the user has requested telephone billing for the charges that are incurred incident to receipt of the requested services offered by or through the ISP;

means for retrieving a telephone number associated with the user;

means for determining a number of users who have previously selected the telephone number for billing the charges incident to receipt of the requested services offered by or through the ISP;

means for accessing a threshold that enables determination of a number of users permitted to bill charges for services to the telephone number;

means for determining whether the number of users exceeds the threshold;

means for denying user-requested telephone billing for the charges that are incurred incident to receipt of the requested services offered by or through the ISP when it is determined that the number of users exceed the threshold; and means for enabling user-requested telephone billing for the charges that are incurred incident to receipt of the requested services offered by or through the ISP when it is determined that the number of users does not exceed the threshold.

34. A system for allowing a user to register with an Internet Service Provider ("ISP") to inspire billing of charges that are incurred incident to receipt of the requested services offered by or through the ISP to a telephone bill, the system comprising:

means for receiving, from a client device, a request to access services offered by or through the ISP;

means for requesting from a user of the client device and in response to the request to access the services offered by or through the ISP to identify a choice of billing for charges that are incurred incident to receipt of the requested services offered by or through the ISP;

means for receiving, from the user, the choice of billing for the charges that are incurred incident to receipt of the requested services offered by or through the ISP;

means for analyzing the response to determine whether the user has requested telephone billing for the charges that are incurred incident to receipt of the requested services offered by or through the ISP;

means for determining, based on analyzing the response, that the user has requested telephone billing for the charges that are incurred incident to receipt of the requested services offered by or through the ISP;

means for retrieving a telephone number associated with the user;

means for identifying a formatting characteristic of the telephone number;

means for accessing format criteria that enable determination of whether the formatting characteristic of the telephone number satisfies the format criteria;

means for comparing the formatting characteristic of the telephone number against format criteria;

means for resolving information based on results of the comparison between the formatting characteristic and the format criteria;

means for using the information resolved based on results of the comparison between the formatting characteristic and the format criteria as a condition precedent to enabling the user-requested telephone billing for the charges that are incurred incident to the receipt of the requested services offered by or through the ISP; and means for enabling the user-requested telephone billing for the charges that are incurred incident to the receipt of the requested services offered by or through the ISP when the formatting characteristic satisfies the format criteria.

35. The method of claim 1 wherein enabling the user-requested telephone billing includes enabling the user to apply the charges that are incurred incident to receipt of the requested services offered by or through the ISP to a telephone bill.

36. The method of claim 35 wherein the telephone bill includes a bill associated with a telephone line of the user or the telephone number of the user.

37. The method of claim 35 wherein the telephone bill includes a bill issued by a telephone company providing the user with a telephone line or the telephone number.

38. The method of claim 3 wherein receiving the request to access services offered though the ISP includes receiving, from the user, a request to purchase goods or services from a retailer and have charges billed to a telephone number account.

39. The method of claim 17 wherein enabling the user-requested telephone billing includes enabling the user to apply the charges that are incurred incident to receipt of the requested services offered by or through the ISP to a telephone bill.

40. The method of claim 39 wherein the telephone bill includes a bill associated with a telephone line of the user or the telephone number of the user.

41. The method of claim 39 wherein the telephone bill includes a bill issued by a telephone company providing the user with a telephone line or the telephone number.

42. The method of claim 19 wherein receiving the request to access services offered though the ISP includes receiving, from the user, a request to purchase goods or services from a retailer and have charges billed to a telephone number account.

43. The method of claim 17 wherein using the information resolved based on the results of the comparison between the formatting characteristic and the format criteria includes using a conclusion that the formatting characteristic satisfies the format criteria.

* * * * *